(12) United States Patent
Cho

(10) Patent No.: US 11,350,249 B2
(45) Date of Patent: *May 31, 2022

(54) METHOD AND APPARATUS FOR DISPLAYING MISSED CALLS ON MOBILE TERMINAL

(71) Applicant: Samsung Electronics Co., Ltd., Suwon-si (KR)

(72) Inventor: Jaewan Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

This patent is subject to a terminal disclaimer.

(21) Appl. No.: 16/994,050

(22) Filed: Aug. 14, 2020

(65) Prior Publication Data

US 2020/0374664 A1 Nov. 26, 2020

Related U.S. Application Data

(63) Continuation of application No. 16/135,827, filed on Sep. 19, 2018, now Pat. No. 10,750,329, which is a
(Continued)

(30) Foreign Application Priority Data

Sep. 20, 2012 (KR) .................. 10-2012-0104722

(51) Int. Cl.
*H04W 4/12* (2009.01)
*H04M 1/724* (2021.01)
*H04M 1/57* (2006.01)

(52) U.S. Cl.
CPC .............. *H04W 4/12* (2013.01); *H04M 1/724* (2021.01); *H04M 1/57* (2013.01); *H04M 1/576* (2013.01); *H04M 2250/60* (2013.01)

(58) Field of Classification Search
CPC ........ H04M 1/57; H04M 1/576; H04M 1/724; H04M 2250/60; H04W 4/12
See application file for complete search history.

(56) References Cited

U.S. PATENT DOCUMENTS 7,283,813 B2   10/2007  Hamanaga et al.
7,409,050 B1*   8/2008  Li ........................... H04M 1/57
                                                              379/142.01
(Continued)

FOREIGN PATENT DOCUMENTS

CN          1674607 A      9/2005
CN        101484870 A      7/2009
(Continued)

OTHER PUBLICATIONS

Korean Office Action dated May 12, 2021, issued in Korean Application No. 10-2020-0104541.
(Continued)

*Primary Examiner* — Kashif Siddiqui
(74) *Attorney, Agent, or Firm* — Jefferson IP Law, LLP

(57) ABSTRACT

A displaying method and apparatus in a mobile terminal are provided. The displaying method in a mobile terminal includes displaying a message for a missed call for a first number on an idle screen or a call list screen when the missed call is generated from the first number, displaying a call history for the first number on an incoming call screen or an outgoing call screen when a call is received from the first number or the call is transmitted to the first number, and changing the message for the missed call for the first number when a call is connected to the first number and displaying the changed message.

14 Claims, 20 Drawing Sheets

Related U.S. Application Data continuation of application No. 14/021,358, filed on Sep. 9, 2013, now Pat. No. 10,097,970.

(56) References Cited

U.S. PATENT DOCUMENTS

| | | | |
|---|---|---|---|
| 8,428,568 B1* | 4/2013 | Kim | H04M 3/436 455/415 |
| 8,547,347 B2 | 10/2013 | Chiang et al. | |
| 8,712,384 B1* | 4/2014 | Goyal | H04M 3/537 455/413 |
| 10,750,329 B2* | 8/2020 | Cho | H04M 1/724 |
| 2003/0166409 A1* | 9/2003 | Ishii | H04M 1/6066 455/569.1 |
| 2005/0070327 A1* | 3/2005 | Watanabe | H04N 1/00307 455/552.1 |
| 2005/0124360 A1 | 6/2005 | Choi | |
| 2006/0025112 A1* | 2/2006 | Hamanaga | H04M 1/56 455/412.1 |
| 2006/0178135 A1* | 8/2006 | Jiang | H04M 3/42042 455/414.1 |
| 2006/0229063 A1 | 10/2006 | Koch | |
| 2007/0081641 A1 | 4/2007 | Veen et al. | |
| 2007/0271527 A1* | 11/2007 | Paas | G06Q 10/10 715/810 |
| 2008/0055263 A1 | 3/2008 | Lemay et al. | |
| 2008/0057926 A1 | 3/2008 | Forstall et al. | |
| 2008/0122796 A1 | 5/2008 | Jobs et al. | |
| 2008/0125178 A1 | 5/2008 | Park et al. | |
| 2008/0248761 A1 | 10/2008 | Seo et al. | |
| 2009/0011741 A1 | 1/2009 | Maguire et al. | |
| 2009/0175264 A1 | 7/2009 | Reitalu et al. | |
| 2009/0176484 A1* | 7/2009 | Lee | H04M 1/575 455/415 |
| 2009/0265666 A1 | 10/2009 | Hsieh et al. | |
| 2009/0271407 A1 | 10/2009 | Hawkins et al. | |
| 2009/0298444 A1 | 12/2009 | Shigeta | |
| 2010/0086112 A1 | 4/2010 | Jiang et al. | |
| 2010/0146384 A1 | 6/2010 | Peev et al. | |
| 2011/0294551 A1 | 12/2011 | Forstall et al. | |
| 2012/0054683 A1 | 3/2012 | Sands et al. | |
| 2012/0287071 A1 | 11/2012 | Wang et al. | |
| 2012/0323933 A1* | 12/2012 | He | H04L 51/24 707/749 |
| 2013/0005315 A1 | 1/2013 | Lemke et al. | |
| 2013/0165185 A1 | 6/2013 | Guo et al. | |
| 2014/0302829 A1* | 10/2014 | Won | H04M 3/436 455/415 |

FOREIGN PATENT DOCUMENTS

| | | | |
|---|---|---|---|
| CN | 101662523 A | 3/2010 | |
| CN | 101834951 A | 9/2010 | |
| CN | 101861562 A | 10/2010 | |
| CN | 101895644 A | 11/2010 | |
| CN | 201733356 A | 2/2011 | |
| CN | 102098628 A | 6/2011 | |
| CN | 102196388 A | 9/2011 | |
| CN | 102291497 A | 12/2011 | |
| CN | 102449988 A | 5/2012 | |
| CN | 102567004 A | 7/2012 | |
| CN | 102694898 A | 9/2012 | |
| EP | 1 971 113 A1 | 9/2008 | |
| KR | 10-2005-0043075 A | 5/2005 | |
| KR | 10-2005-0055484 A | 6/2005 | |
| KR | 10-2005-0094586 A | 9/2005 | |
| KR | 10-0815522 B1 | 3/2008 | |
| KR | 10-2009-0013433 A | 2/2009 | |
| KR | 10-2009-0022926 A | 3/2009 | |
| KR | 20110050248 A | 5/2011 | |
| RU | 2007137696 A | 4/2009 | |
| WO | 03/056789 A1 | 7/2003 | |
| WO | 2007/131316 A1 | 11/2007 | |

OTHER PUBLICATIONS

European Search Report dated Mar. 15, 2019, issued in European Application No. 18206749.6-1216.
Indian Office Action dated Oct. 1, 2019, issued in Indian Application No. 514/MUMNP/2015.
Korean Office Action dated Nov. 19, 2019, issued in Korean Application No. 10-2019-0106029.
Chinese Office Action dated Apr. 3, 2020, issued in Chinese Application No. 201811199605.2.
Korean Office Action dated Nov. 6, 2020, issued in Korean Application No. 10-2020-0104541.
Chinese Office Actions dated Nov. 25, 2020, issued in Chinese Application No. 201811199604.8.
Chinese Office Actions dated Dec. 3, 2020, issued in Chinese Application No. 201811199605.2.

* cited by examiner

METHOD AND APPARATUS FOR DISPLAYING MISSED CALLS ON MOBILE TERMINAL

PRIORITY

This application is a continuation application of prior application Ser. No. 16/135,827, filed on Sep. 19, 2018, which has issued as U.S. Pat. No. 10,750,329 on Aug. 18, 2020; which is a continuation application of prior application Ser. No. 14/021,358, filed on Sep. 9, 2013, which has issued as U.S. Pat. No. 10,097,970 on Oct. 9, 2018; and which has claimed priority under 35 U.S.C. § 119(a) of a Korean patent application number 10-2012-0104722, filed on Sep. 20, 2012 in the Korean Intellectual Property Office, the entire disclosure of which is incorporated by reference herein in its entirety.

BACKGROUND OF THE INVENTION

1. Field of the Invention

The present invention relates to an additional function of a mobile terminal. More particularly, the present invention relates to a method of variously displaying a message for a missed call according to situations and an apparatus thereof.

2. Description of the Related Art

The mobile terminal market has grown rapidly within a short time due to ongoing advances in technology and the provision of additional functions associated with a smart phone. For example, various applications beyond the basic default applications associated with a mobile terminal have been developed based on requests of users and can be installed on the mobile terminal. Thus, the user may use voice information, character information, video information, Moving Picture Experts Group (MPEG) layer 3 (NIP-3), and games through the mobile terminal.

In the related art, event information received in a user's absence while using a mobile terminal is displayed as a message on an idle screen when the user activates a display unit. The absence event includes a push message associated with an application. The message displays the number of received events by type, and is displayed as a text in a pop-up form. Accordingly, the user may check the number of events received in the user's absence by types through an absent message displayed on the idle screen.

However, since the message according to the related art displays only the number of received events in the user's absence, various information such as from whom, how many times, and what type of events are received may not be provided to the user.

Further, in a case in which a call is missed, a message for the missed call disappears only when the user checks a phone history in the user's absence of a call log. That is, since a message for a missed call is displayed or disappears regardless of whether the user connects a call with a missed call phone number, the user may be confused.

Accordingly, there is a need for a method capable of permitting a user to easily check event information received in the user's absence and an apparatus thereof.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method capable of permitting a user to easily check event information received in the user's absence and an apparatus thereof.

Another aspect of the present invention is to provide a method capable of permitting a user to intuitively recognizing the transaction of an event in the user's absence, thereby improving convenience of the user, and an apparatus thereof.

In accordance with an aspect of the present invention, a displaying method in a mobile terminal is provided. The method includes displaying a message for a missed call for a first number on an idle screen or a call list screen when the missed call is generated from the first number, displaying a call history for the first number on an incoming call screen or an outgoing call screen when a call is received from the first number or the call is transmitted to the first number, and changing the message for the missed call for the first number when a call is connected to the first number and displaying the changed message. The changing of the message for the missed call for the first number includes removing the message for the missed call for the first number from the idle screen, and changing the message for the missed call for the first number and displaying the changed message on the call list screen.

In accordance with another aspect of the present invention, a mobile terminal is provided. The mobile terminal includes a display unit, and a controller controlling to display a message for a missed call for a first number on an idle screen or a call list screen when the missed call is generated from the first number, to display a call history for the first number on an incoming call screen or an outgoing call screen when a call is received from the first number or the call is transmitted to the first number, and to change the message for the missed call for the first number when a call is connected to the first number and display the changed message. The controller controls to remove the message for the missed call for the first number from the idle screen, and to change the message for the missed call for the first number and display the changed message on the call list screen.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
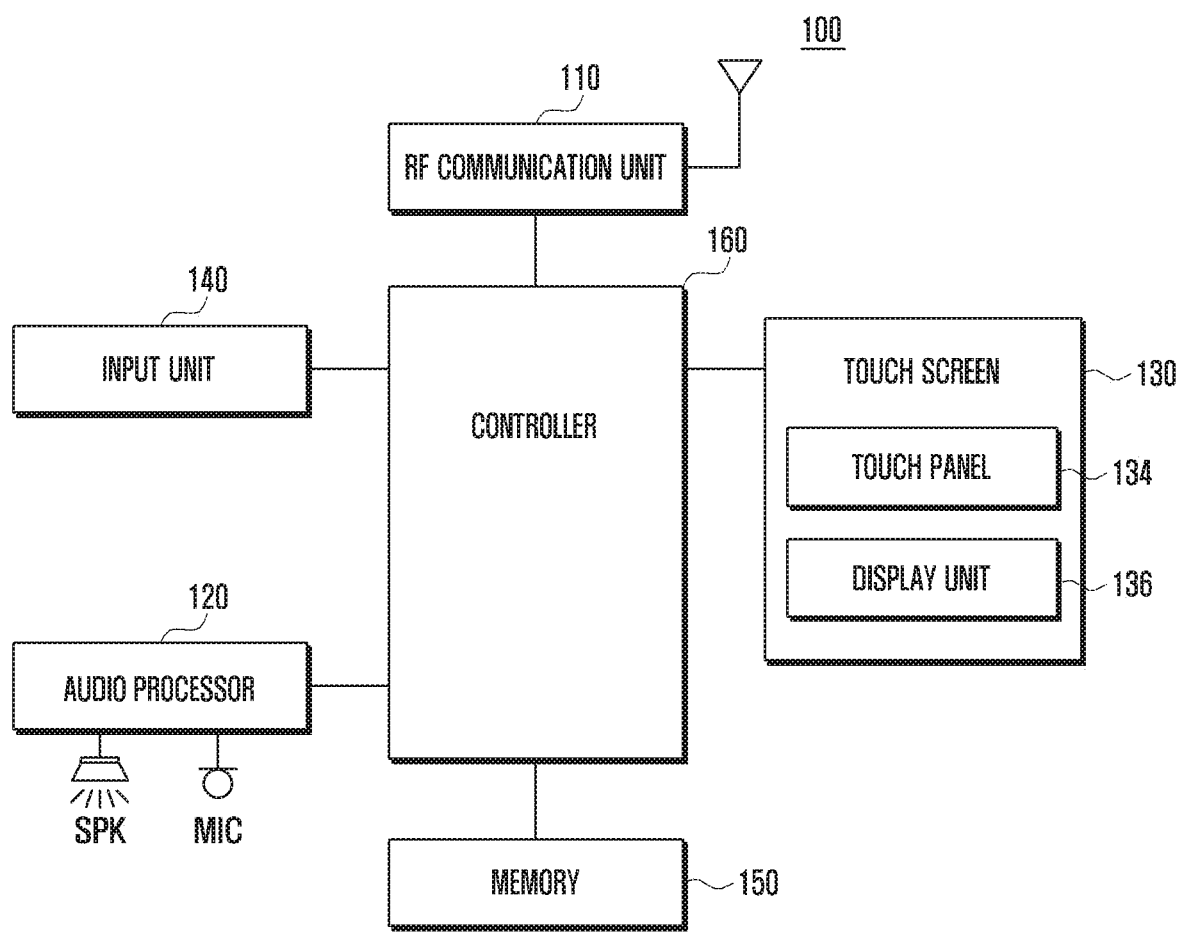
FIG. 1 is a block diagram illustrating an internal configuration of a mobile terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this document, an idle state represents a state where a mobile terminal is turned-on but a display unit is turned-off. Even in the idle state, event information is received from an external terminal. An active state includes a state of displaying an idle screen on a display unit, and refers to an idle state where a user may perform a specific function through key input.

For example, if a specific key provided at a mobile terminal in the idle state is selected, the mobile terminal is converted from the idle state into the active state so that an idle screen is displayed on the display unit. If a folder of a folder type mobile terminal is open, a folder of a slide type mobile terminal is slid, or a folder of a swing type mobile terminal is swung, the mobile terminal is converted from the idle state to the active state so that the idle screen is displayed on the display unit.

In this document, a missed call situation refers to a situation where a call from a corresponding number is not connected; that is, a call from an arbitrary number is missed. The withdrawal of the missed call situation refers to a case of connecting a call for a corresponding number after a call from an arbitrary number is missed. In this document, an absent message refers to a message associated with the missed call and to a message which the user does not check after reception of the message. Furthermore, since the main function of a mobile communication terminal still lies in a voice call and a message sending and receiving, it is important to conveniently provide a message relating to those functions to the user. Accordingly, in the following description, a missed call and an absent message are mainly described. However, the present invention is not limited thereto. That is, the present invention also includes a push message associated with any of a variety of applications.

FIG. 1 is a block diagram illustrating an internal configuration of a mobile terminal according to an exemplary embodiment of the present invention.

Referring to FIG. 1, the mobile terminal 100 may include a Radio Frequency (RF) communication unit 110, an audio processor 120, a touch screen 130, an input unit 140, a memory 150, and a controller 160.

The mobile terminal 100 is a personal communication terminal having a wireless communication function, and may include a smart phone, a digital broadcasting receiver, a Personal Digital Assistant (PDA), an International Mobile Telecommunication 2000 (IMT-2000) terminal, a Wideband Code Division Multiple Access (WCDMA) terminal, a Universal Mobile Telecommunication Service (UMTS) terminal, and the like.

The RF communication unit 110 performs a transceiving function of corresponding data for wireless communication of the mobile terminal 100. The RF communication unit 110 may include an RF transmitter up-converting a frequency of a transmitted signal and amplifying the signal, an RF receiver low-noise-amplifying a received signal and down-converting the frequency. Further, the RF communication unit 110 may receive data through a wireless channel and output the received data to the controller 160, and may transmit data output from the controller 160 through the wireless channel.

The audio processor 120 may be configured by a CODEC. The CODEC may include a data CODEC processing packet data and an audio CODEC processing an audio signal such as a voice. The audio processor 120 converts a digital audio signal into an analog audio signal through the audio CODEC and plays the converted analog audio signal through a speaker (SPK). The audio processor 120 converts an analog audio signal input from a microphone (MIC) into a digital audio signal.

The touch screen 130 includes a touch panel 134 and a display panel 136. The touch panel 134 detects a touch input of the user. The touch panel 134 may be configured by a touch sensing sensor such as a capacitive overlay sensor, a resistive overlay sensor, an infrared beam sensor, or a pressure sensor. Various types of sensor devices capable of detecting contact or pressure of an object may be configured as the touch panel 134 in addition to the foregoing sensors.

The touch panel 134 detects a touch input of the user and generates and transmits a detection signal to the controller 160. The detection signal includes coordinate data reflecting the location at which the user inputs the touch. When the user inputs a touch location moving operation, the touch panel 134 generates the detection signal including coordinate data of a touch location moving path to the controller 160.

The display unit 136 may be configured by a Liquid Crystal Display (LCD), an Organic Light Emitting Diode (OLED), and an Active Matrix Organic Light Emitting Diode (AMOLED). The display unit 130 visually provides a menu of the mobile terminal 100, input data, function setting information and other various information to the user. According to an exemplary embodiment of the present invention, the display unit 136 displays a message for an event received in the user's absence and displays a video necessary for processing the event received in the user's absence.

The mobile terminal 100 may include a touch screen, but the exemplary embodiment of the present invention is not only applicable to the mobile terminal 100 including the touch screen. When an exemplary embodiment of the present invention is applied to a mobile terminal having no touch screen, the touch screen shown in FIG. 1 may be changed to perform only a function of the display unit 136, and the function of the touch panel 134 is performed by an input unit 140 to be described below.

The input unit 140 receives an input of the user for controlling the mobile terminal 100 and generates and transfers an input signal to the controller 160. The input unit 140 may be configured by a key pad including numeric keys and arrow keys, and may be provided at one side of the mobile terminal 100 by a given function key. According to exemplary embodiments of the present invention, all operations of the mobile terminal 100 are possible by only the touch screen 130. In this case, the touch panel 134 may execute a function of the input unit 140.

The memory 150 stores programs and data necessary for an operation of the mobile terminal 100. The memory 150 may be divided into a program area and a data area.

The program area may store a program for controlling an overall operation of the mobile terminal 100, and a program provided for default operations in the mobile terminal such as an operating system for booting the mobile terminal 100. The program area of the memory 150 may store an application separately installed by the user, for example, a game application, a social network service execution application, and the like. More particularly, the program area may store a program for processing an event received in the user's absence.

The data area is an area for storing data generated according to use of the mobile terminal 100, and may store images, moving images, phone-books, and audio data. More particularly, the data area may store event information received in the user's absence.

The controller 160 controls an overall operation of respective constituent elements of the mobile terminal 100. More particularly, the controller 160 may classify a type of an event received in a user's absence, and determine whether a missed call is generated.

For example, when the event received in the user's absence is a missed call from another user A, the controller 160 controls the display unit 136 to display a message for the missed call from A. At the same time, the controller 160 controls the display unit 136 to include the message for the missed call from A in a call list screen.

Meanwhile, when calls from a plurality of users are missed, the controller 160 may manage messages for the missed calls according to the caller (i.e., user) number. An exemplary user interface for displaying the message for the missed call will be described later with reference to the accompanying drawings.

After the call is missed, when a call is received from the user A, associated with the missed call, or the call is transmitted to A, the controller 136 displays a call history for A on an incoming call screen or an outgoing call screen. That is, when the call is received or transmitted from the same number after the call is missed, the controller 160 may control the display unit 136 to display a past call history with the number on the incoming call screen or the outgoing call screen.

If the call is connected to the same number so that the missed call situation is released after the generation of the missed call, the controller 160 may control the display unit 130 to remove or change the message for the missed call for the number in the idle screen. If the missed call situation for A is released, the controller 160 may change a display associated with A on the call list screen.

When there exists an absent message for the same user as well as a missed call, the controller 160 may display the absent message on the outgoing call screen or the incoming call screen.

A more detailed user interface of the display screen will be described with reference to the accompanying drawings.

Figure 2:
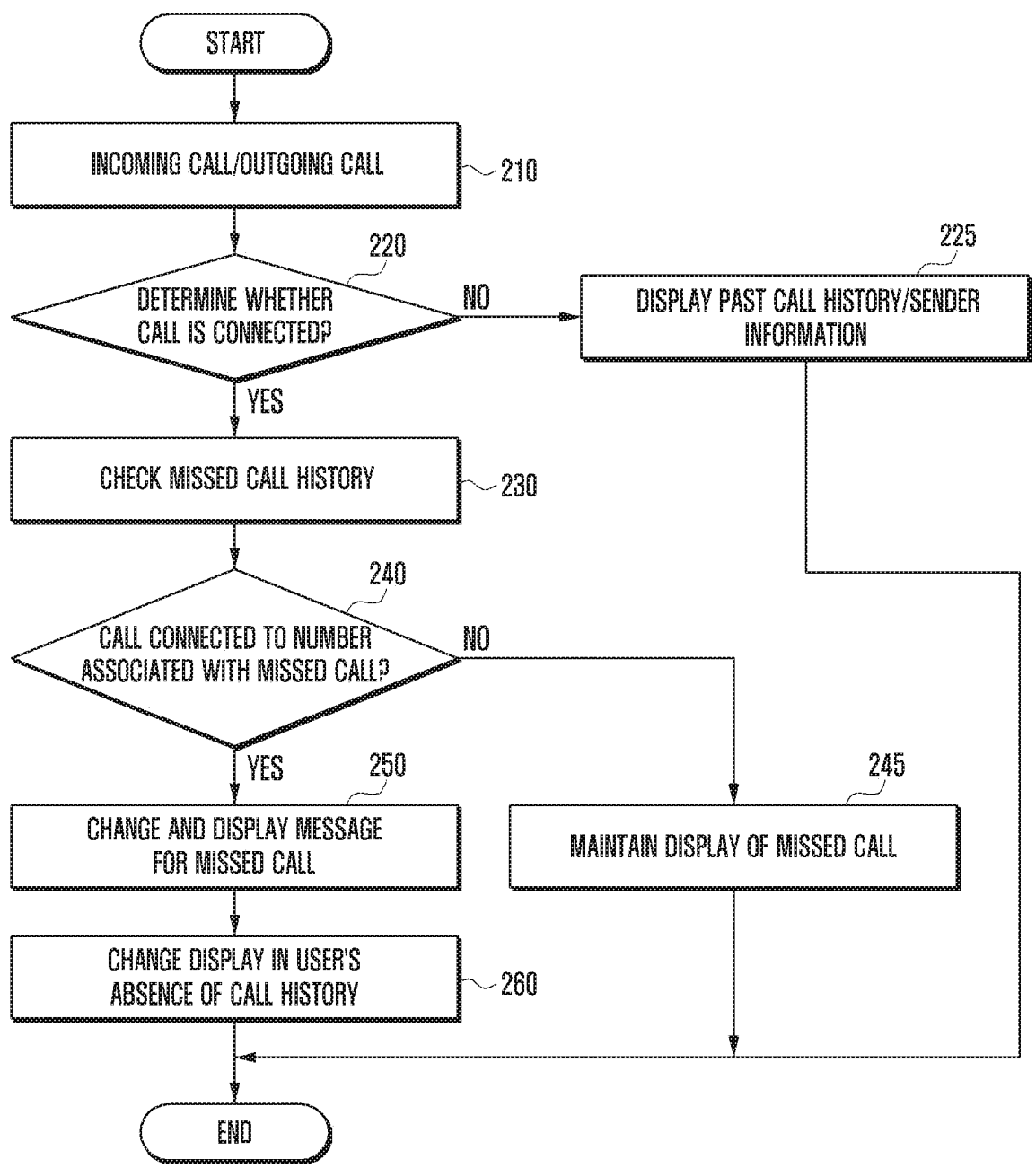
FIG. 2 is a flowchart illustrating a method of displaying and removing a message for a missed call according to an exemplary embodiment of the present invention.

FIG. 2 is a flowchart illustrating a method of displaying and removing a message for a missed call according to an exemplary embodiment of the present invention.

Referring to FIG. 2, when a call is received or transmitted in step 210, the controller 160 determines whether a call is connected in step 220. If the call is not connected, it means that the call has been missed for a corresponding number, and the controller 160 displays a message for the missed call on an idle screen or a call list screen in step 225.

If it is determined in step 220 that the call is connected, the controller 160 checks a missed call history for the number to which the call is connected in step 230. If it is determined in step 230 that there exists a missed call for the number, the controller 160 determines if the call is connected to the same number associated with the missed call in step 240. That is, if the call is connected to the same number, it may be determined that the missed call situation for the corresponding number is released.

If it is determined in step 240 that the call is connected to the same number associated with the missed call, the controller 160 may change and display the message for the missed call in step 250. In more detail, the controller 160 may remove a message for a missed call on an idle screen and change at least one of a shape, a form, a color, or a combination thereof of the message for a missed call for the number on a call list screen and display the changed message. Also, the controller 160 may change the display in the user's absence of the call history in step 260.

On the other hand, if it is determined in step 240 that the call is not connected to the same number associated with the missed call, it may be determined that an event associated with the missed call for the number is not generated. Accordingly, the controller 160 maintains display of the missed call without changing the display of the message for the missed call in step 245. In more detail, the controller 160 maintains a state in which a message for a missed call for the number is not displayed, and maintains a message for a missed call for another number when the missed call for the other number is displayed.

Figure 3A:
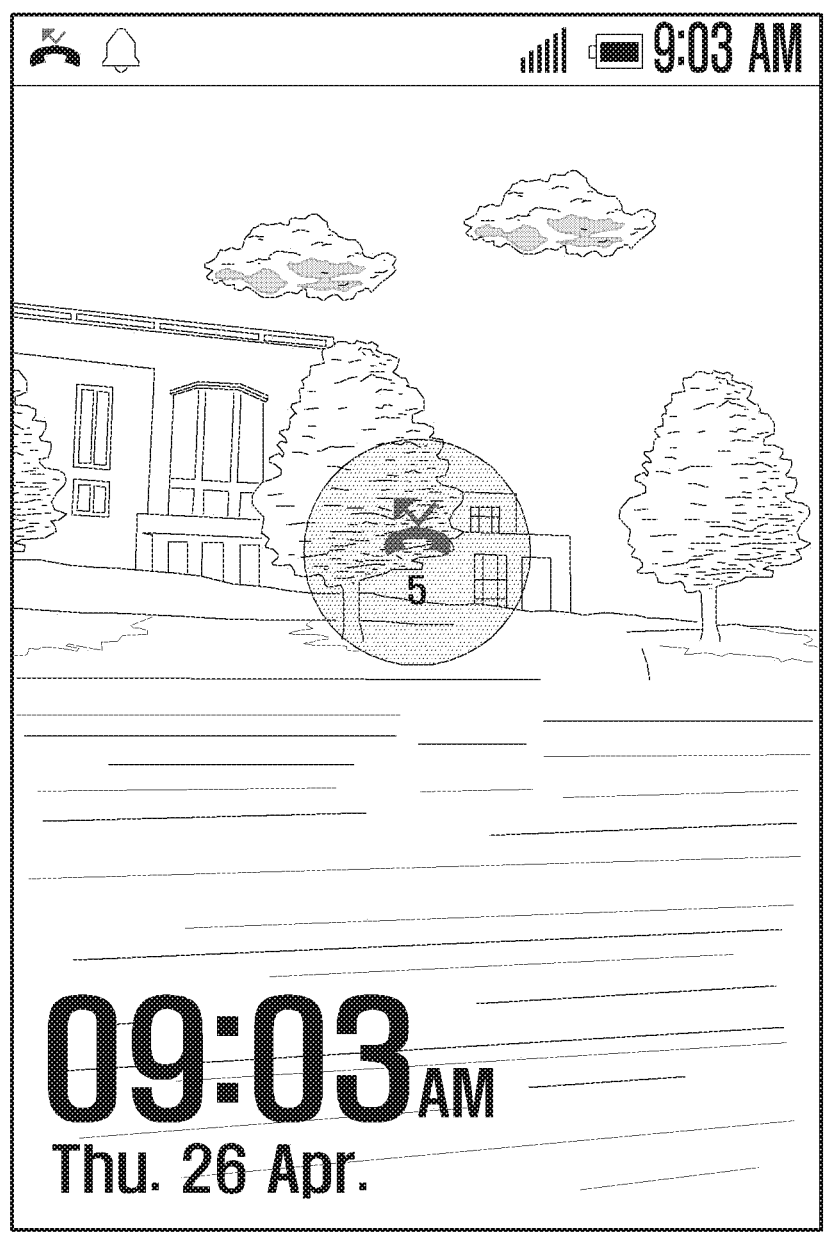
FIGS. 3A to 3F are diagrams illustrating a graphic interface displaying a message for a missed call on an idle screen according to an exemplary embodiment of the present invention.

FIGS. 3A to 3F are diagrams illustrating a graphic interface displaying a message for a missed call on an idle screen according to an exemplary embodiment of the present invention FIG. 3A illustrates a case of displaying a generation number of a missed call together with a message icon for the missed call on an idle screen without separately classifying a caller number. More specifically, FIG. 3A illustrates a message display when there exist five missed calls, and the five missed calls may be generated by the same number or different numbers.

Figure 3B:
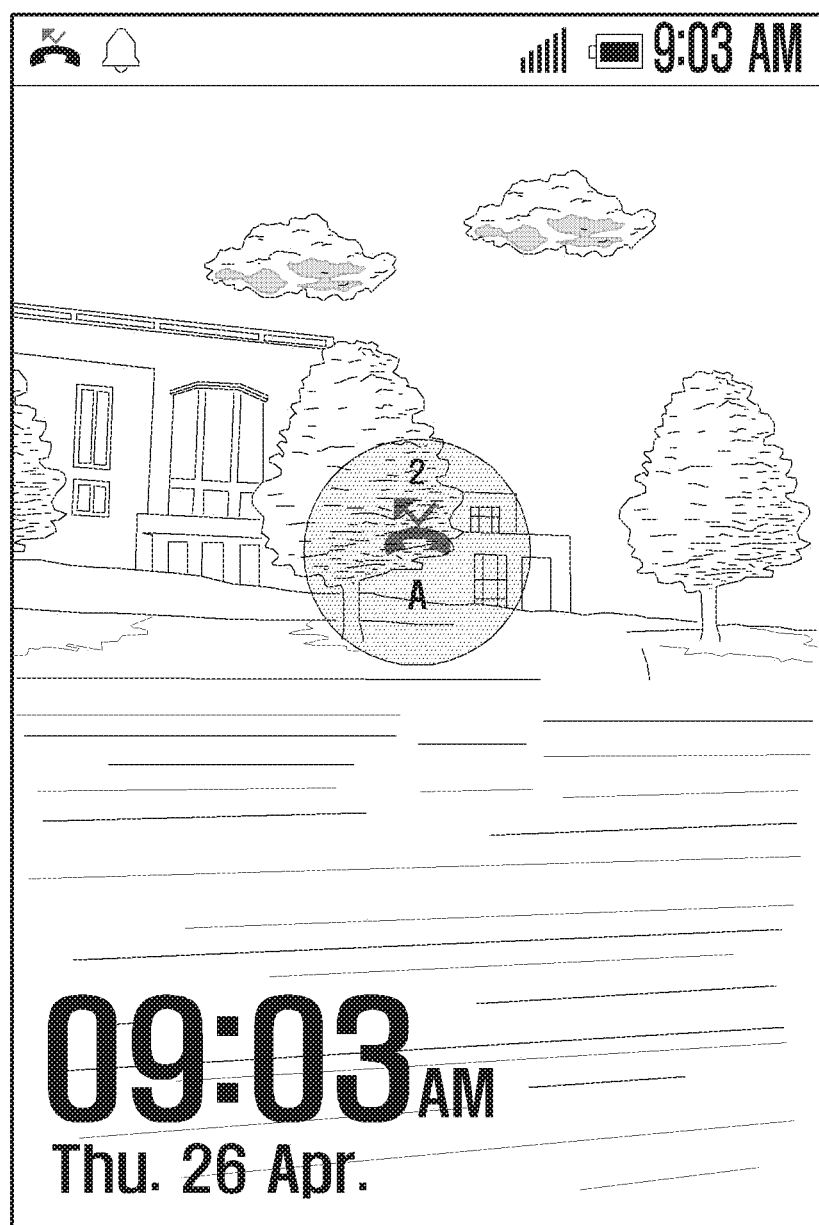

FIG. 3B illustrates an example of displaying a message for a missed call when the missed call is generated by one user. More specifically, FIG. 3B illustrates that two missed calls are generated by another user A. The user A may be a caller number or a name stored in a phone book for the caller number.

Figure 3C:
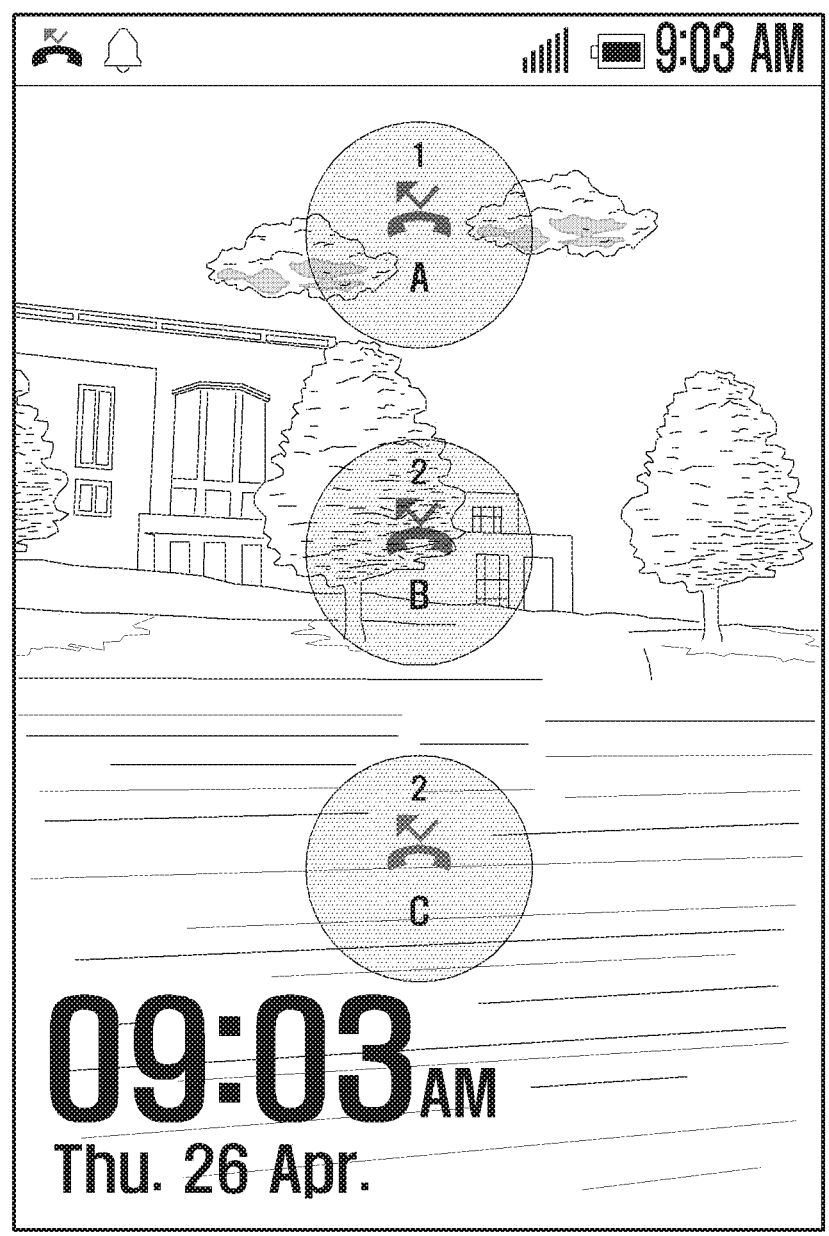

FIG. 3C illustrates a case where a caller number of a missed call, and the number of missed calls for a corresponding number are displayed together with a message icon for the missed call. More specifically, FIG. 3C illustrates that one call from user A is missed, two calls from user B are missed, and two calls from user C are missed. In the case of a smart phone, it is preferable that the missed call is displayed on a first page of an idle screen.

Figure 3D:
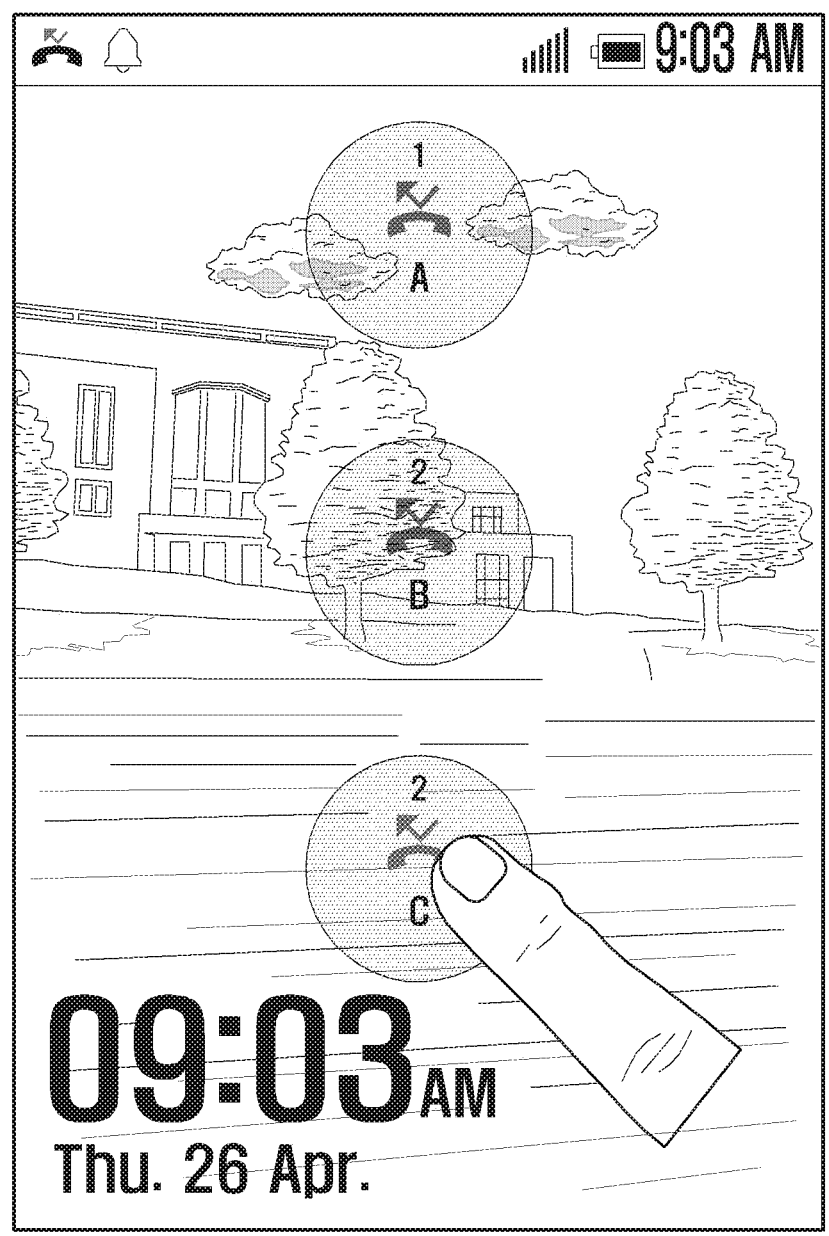

FIG. 3D illustrates a case of connecting a call with a corresponding number by selecting message display of the missed call according to the exemplary embodiment of the present invention. More specifically, as shown in FIG. 3D, the user selects the message display associated with the calls missed from user C on the idle screen to attempt call connection with a corresponding number of user C.

Figure 3E:
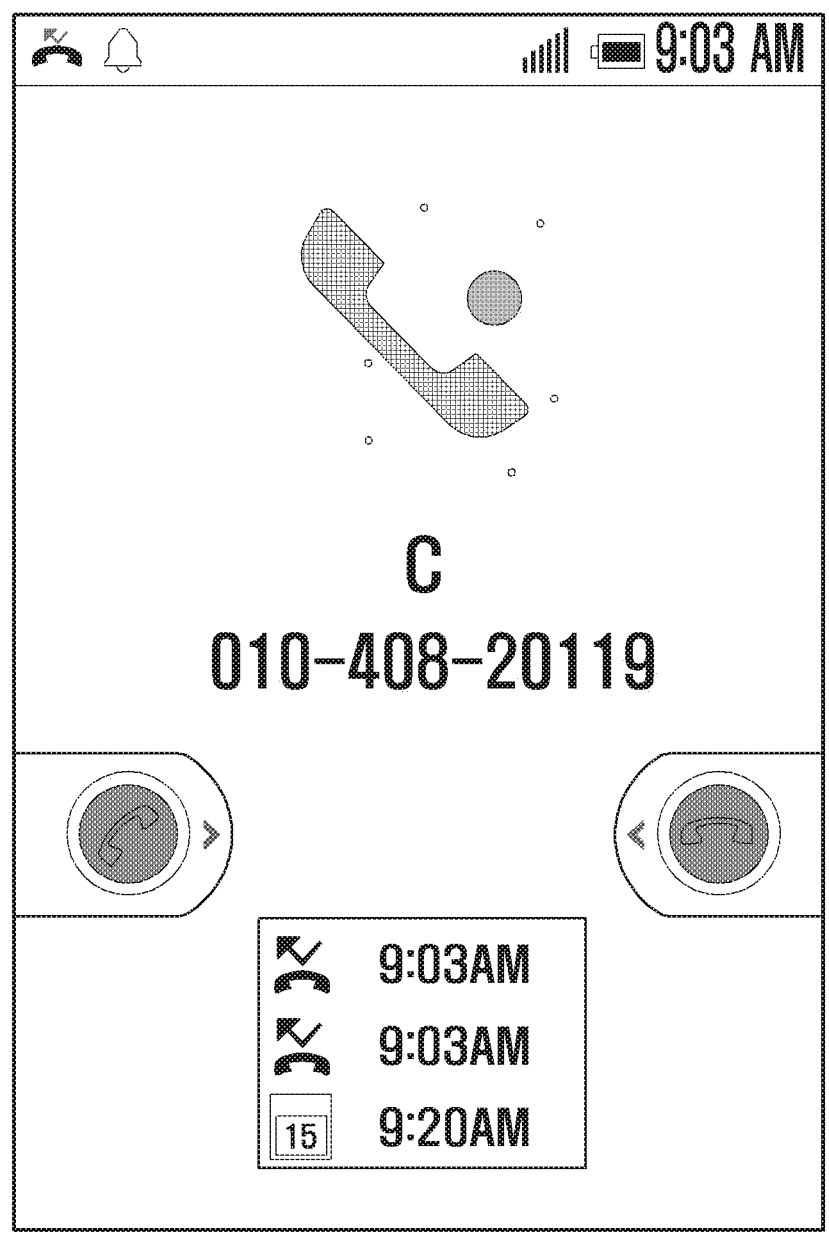

FIG. 3E illustrates an example of an interface for a call connection screen with a sender of the missed call. According to the exemplary embodiment of the present invention, a missed call history and sender information about sender C of the missed call may be displayed on an incoming call screen or an outgoing call screen for the sender C.

Figure 3F:
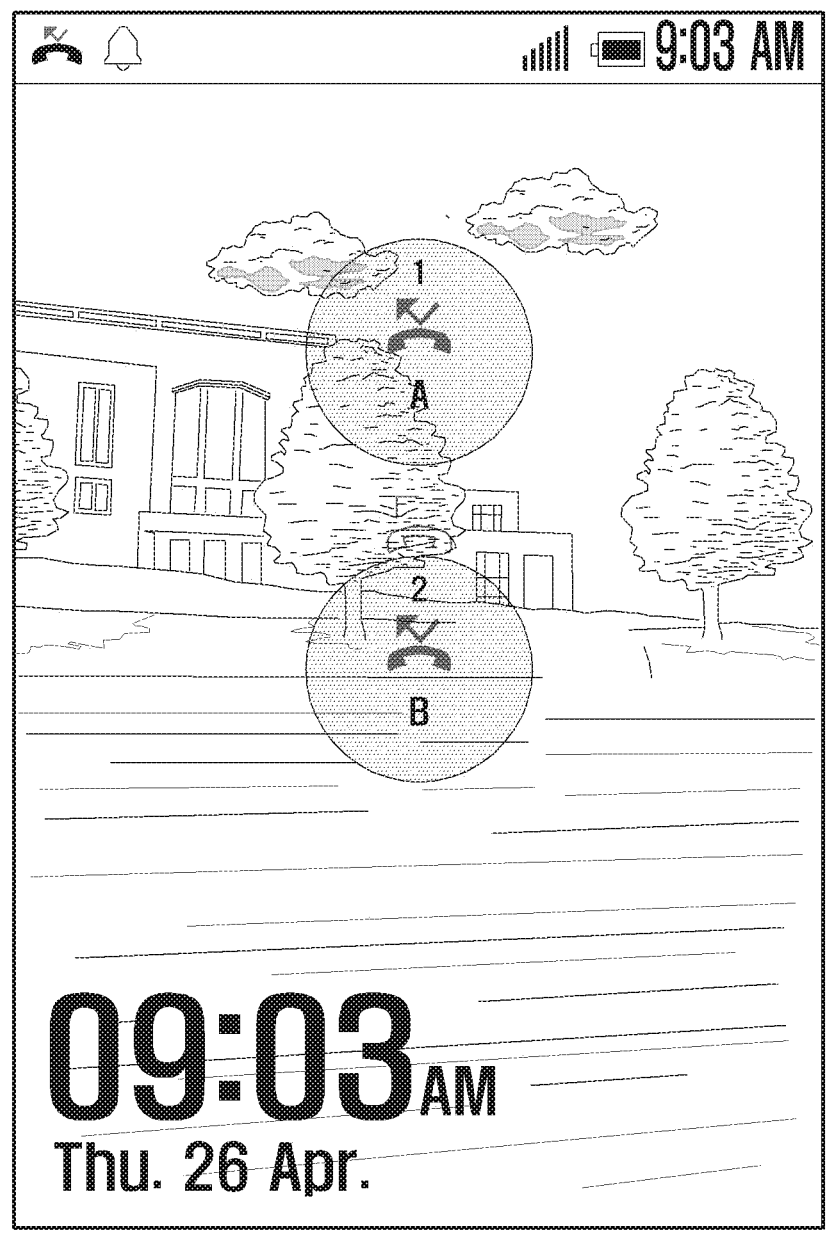

In FIG. 3F, when the call is connected so that a missed call situation for C is released, message display of the missed call for C may be removed on the idle screen. However, since the missed call situations for remaining users A and B are not released, the message displays of the missed calls from users A and B are maintained on the idle screen. In addition, the message for the missed call from user C is changed and displayed on the call list screen (not shown).

FIGS. 4A to 4D are diagrams illustrating a graphic interface which displays and changes a message for a missed call for one person according to an exemplary embodiment of the present invention.

Figure 4A:
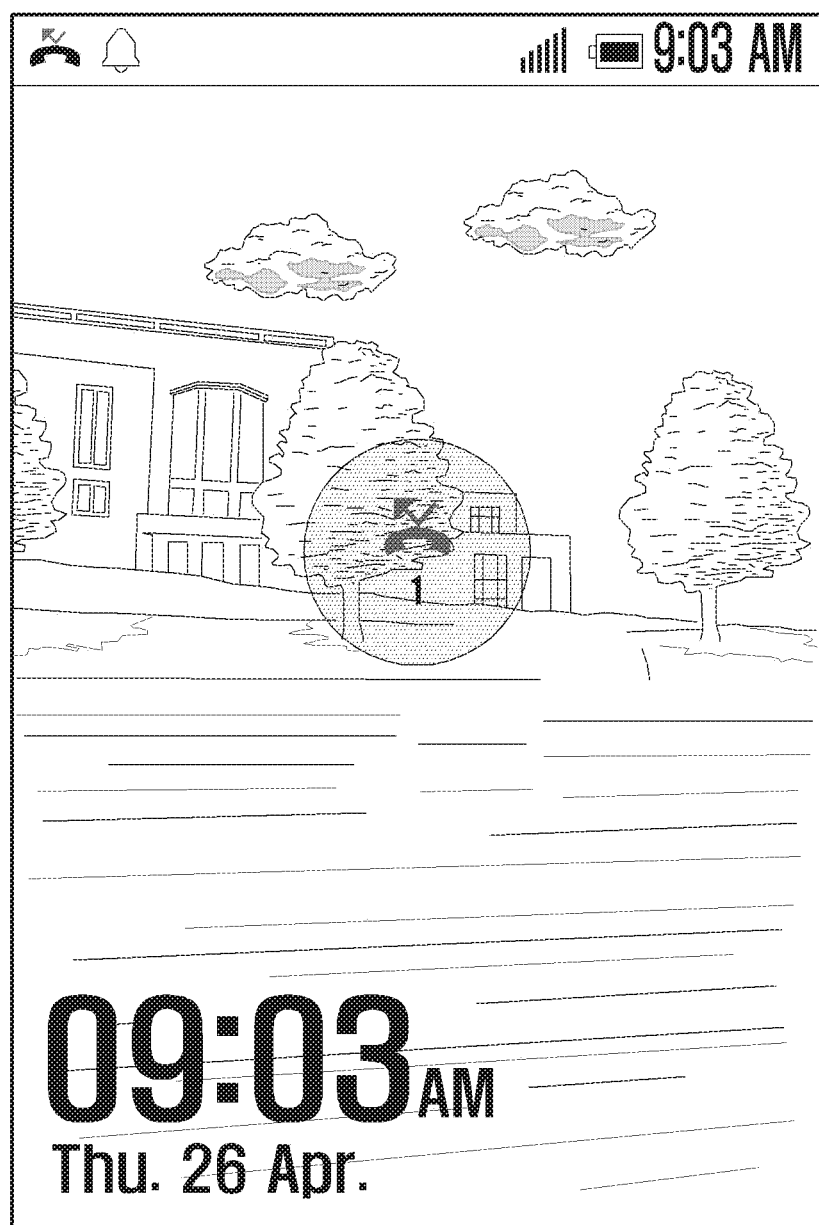
FIGS. 4A to 4D are diagrams illustrating a graphic interface which displays and changes a message for a missed call for one person according to an exemplary embodiment of the present invention.
Figure 4B:
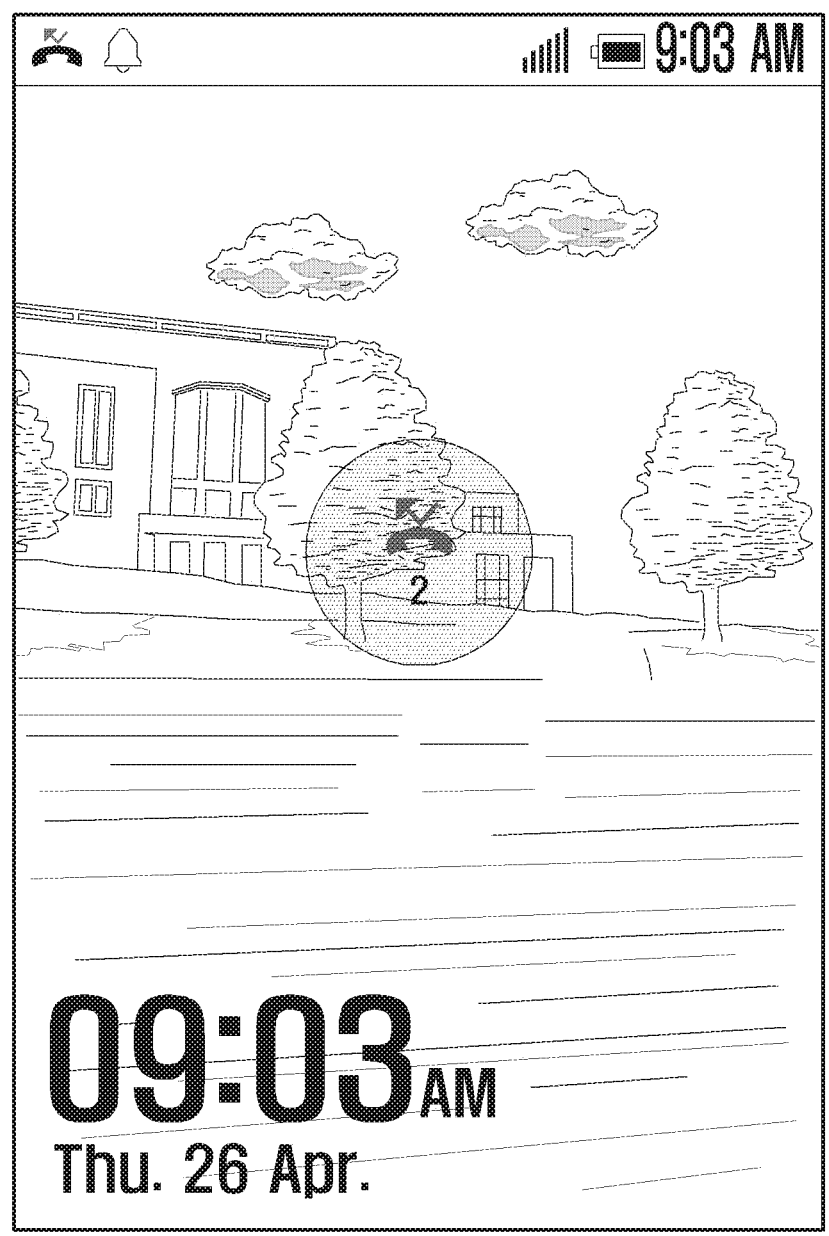

FIG. 4A illustrates a graphic interface when one call for one user is missed. When two calls for the same user are missed, message display of the missed calls on the idle screen may be as shown in FIG. 4B. When user again receives a phone call from user A, a graphic interface of the incoming call screen is illustrated in FIG. 4C.

Figure 4C:
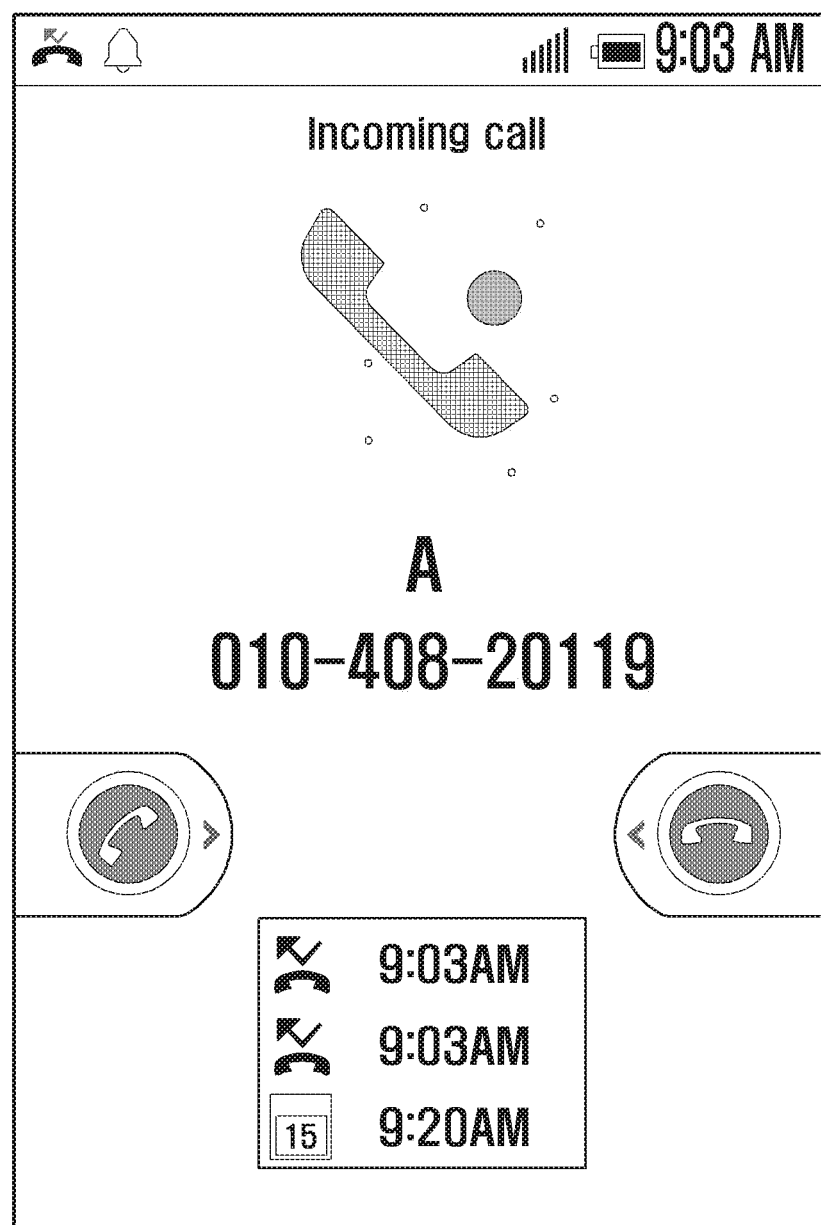

FIG. 4C illustrates an example of an incoming call screen displayed when the user is telephoned by user A. According to the exemplary embodiment of the present invention, recent past call history and sender information may be displayed on the incoming call screen while reporting that the call from user A is missed. In exemplary embodiments of the present invention, the call history may include a message reception/transmission list, contents of the message, an incoming/outgoing call list, and a missed call. Meanwhile, the sender information may include a schedule, a memo, Social Networking Service (SNS) contents related with a sender, and the like.

Figure 4D:
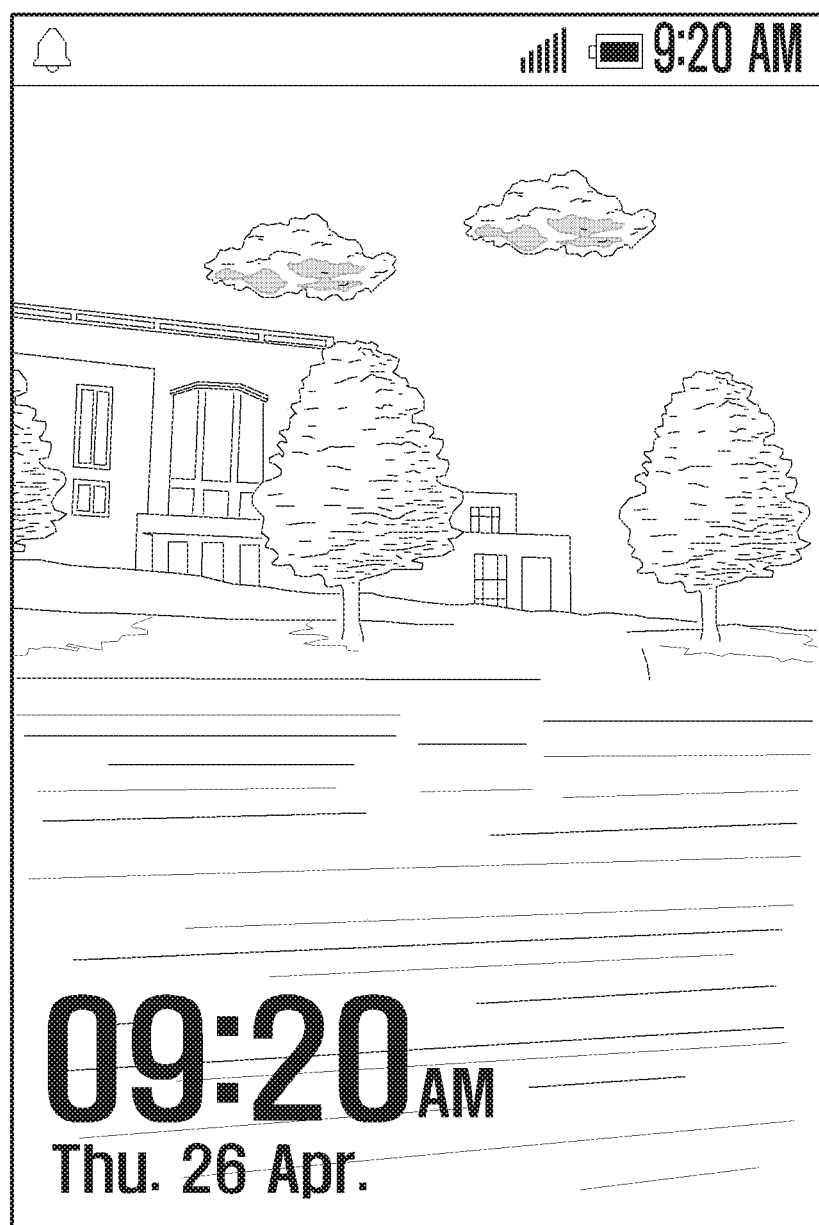

Meanwhile, in FIG. 4C, if a call is terminated after being connected with user A, as shown in FIG. 4D, display of the missed call from user A is removed from a lock screen and the idle screen except for a call list screen.

Figure 4E:
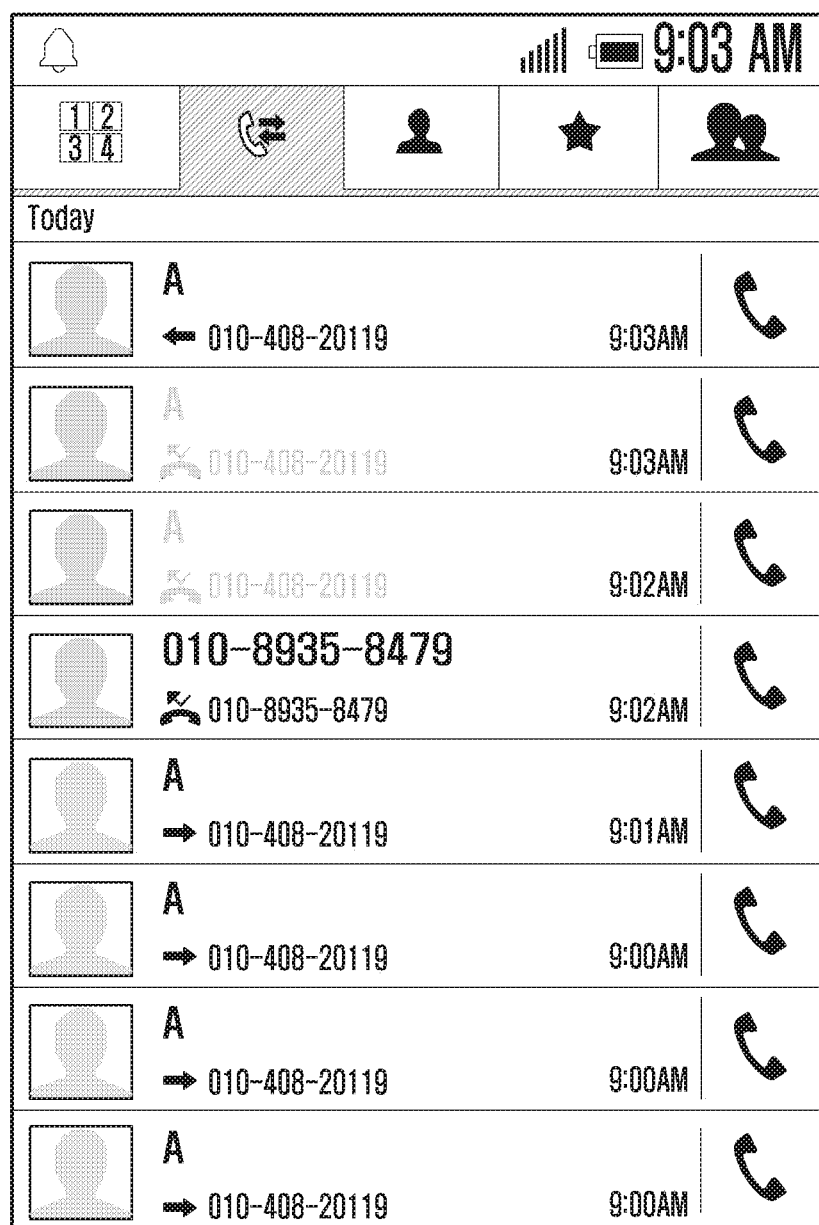
FIG. 4E illustrates a call list screen according to an exemplary embodiment of the present invention.

FIG. 4E illustrates a call list screen according to an exemplary embodiment of the present invention.

Referring to FIG. 4E, a message for the missed call may be changed and the changed message may be displayed without removal. Since the missed call situation for A is released, a missed call history of user A may be transparently displayed as shown in FIG. 4E. According to exemplary embodiments of the present invention, the number that released the missed call situation may be transparently displayed on a call list screen, the color of the number may be changed and displayed, the number may be displayed with an icon different from other numbers to be distinguished, and the like.

That is, according to exemplary embodiments of the present invention, the message for the missed call for the number that released the missed call situation is removed on the idle screen, so that unnecessary recall may be prevented as the call list screen is changed.

Figure 5A:
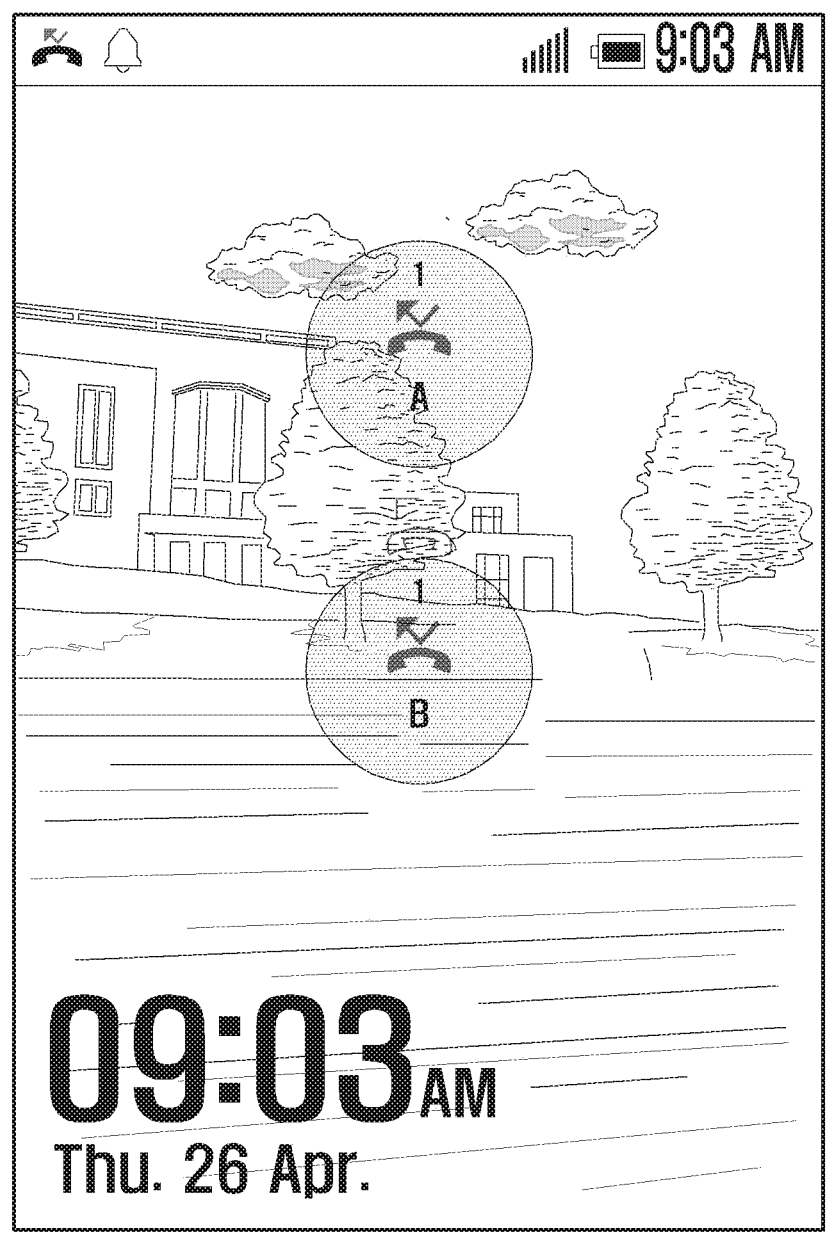
FIGS. 5A to 5C are diagrams illustrating a detailed graphic interface which displays and changes a message for a missed call for one or more persons according to an exemplary embodiment of the present invention.
Figure 5B:
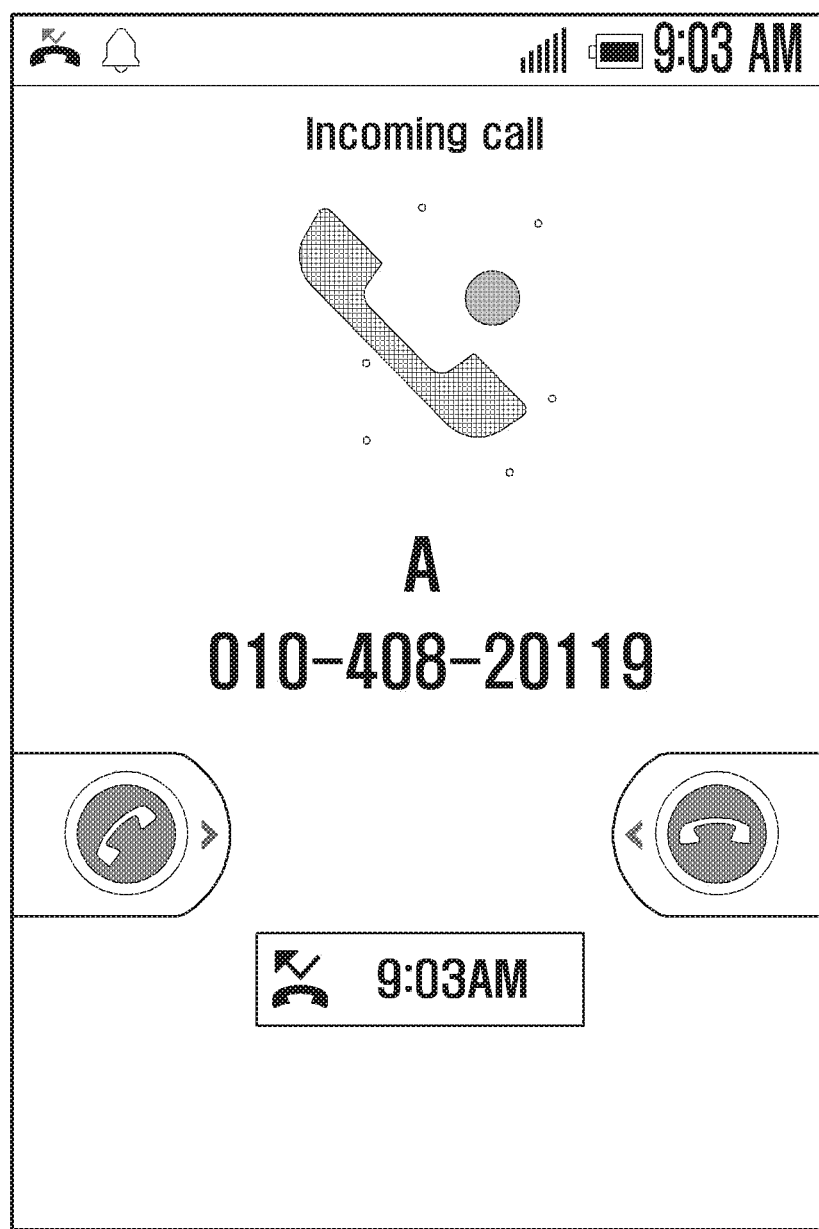
Figure 5C:
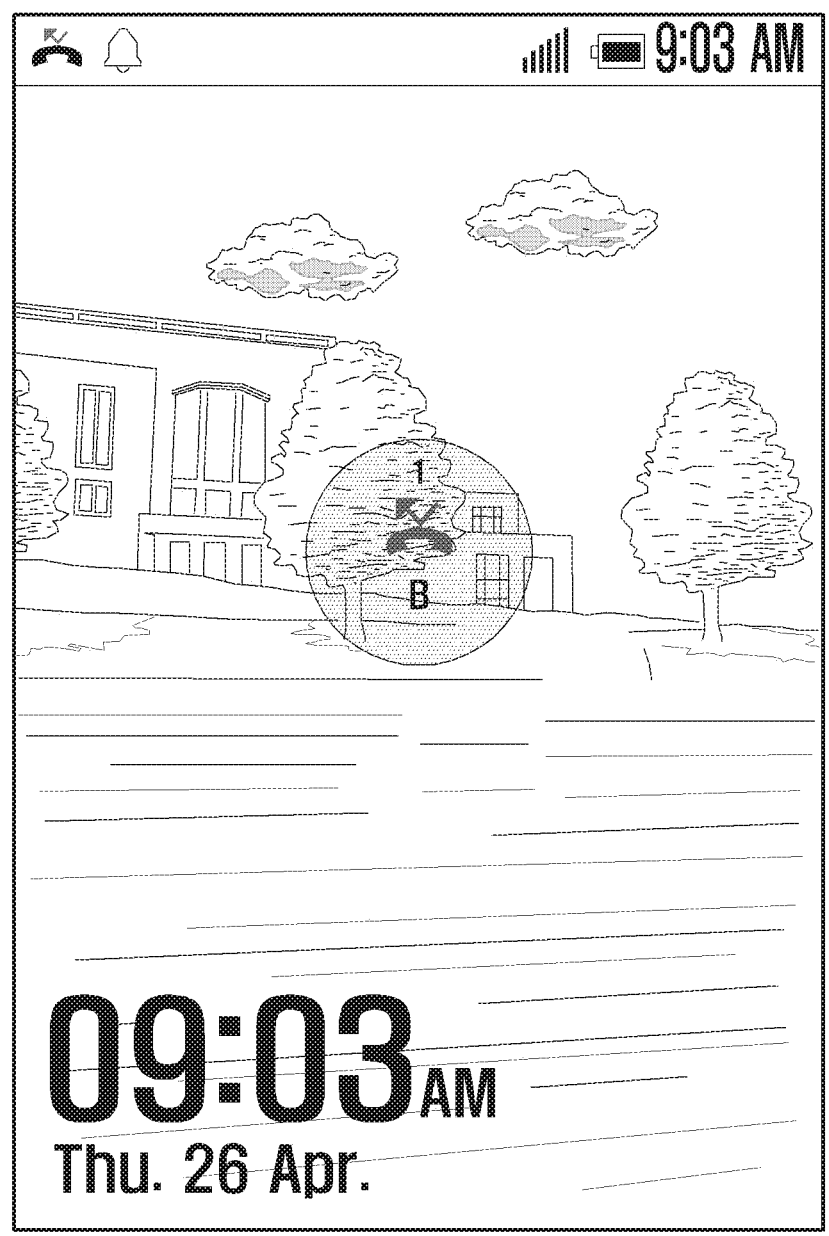

FIGS. 5A to 5C are diagrams illustrating a graphic interface which displays and changes a message for a missed call for one or more persons according to an exemplary embodiment of the present invention.

FIG. 5A illustrates a graphic interface when one missed call from A is generated and one missed call from B is generated. Meanwhile, different from FIG. 5A, a message for a missed call may be displayed by displaying only the generation number of missed calls for a simple graphic interface without classifying A and B so as to implement a simple graphic interface. In this case, when the user again receives a phone call from user A, a graphic interface of the incoming call screen is shown in FIG. 5B.

FIG. 5B illustrates an example of an incoming call from user A that is screened.

According to exemplary embodiments of the present invention, recent past call history and sender information may be displayed on the incoming call screen while reporting that the call from user A is missed.

Meanwhile, if a call is terminated after being connected with A in FIG. 5B, display of the missed call generated by user A may be removed on a lock screen and the idle screen except for a call list screen as shown in FIG. 5C. However, display of the missed call for user B should be maintained. That is, since the missed call situation for user B is not released, it may be displayed on the idle screen that one missed call from user B exists, as shown in FIG. 5C.

In a case of the call list screen (not shown), the call list screen is displayed to distinguish a case of user A, where a real call is achieved after generation of the missed call, from a case of user B, where the call is not achieved yet after the generation of the missed call, so that the user may easily recognize the presence of the missed call. For example, in a case of user A where the missed call is released, a missed call list may be transparently displayed, the color of the missed call list may be changed to be displayed, an icon different from B may be displayed to distinguish A from B, and the like.

Figure 6A:
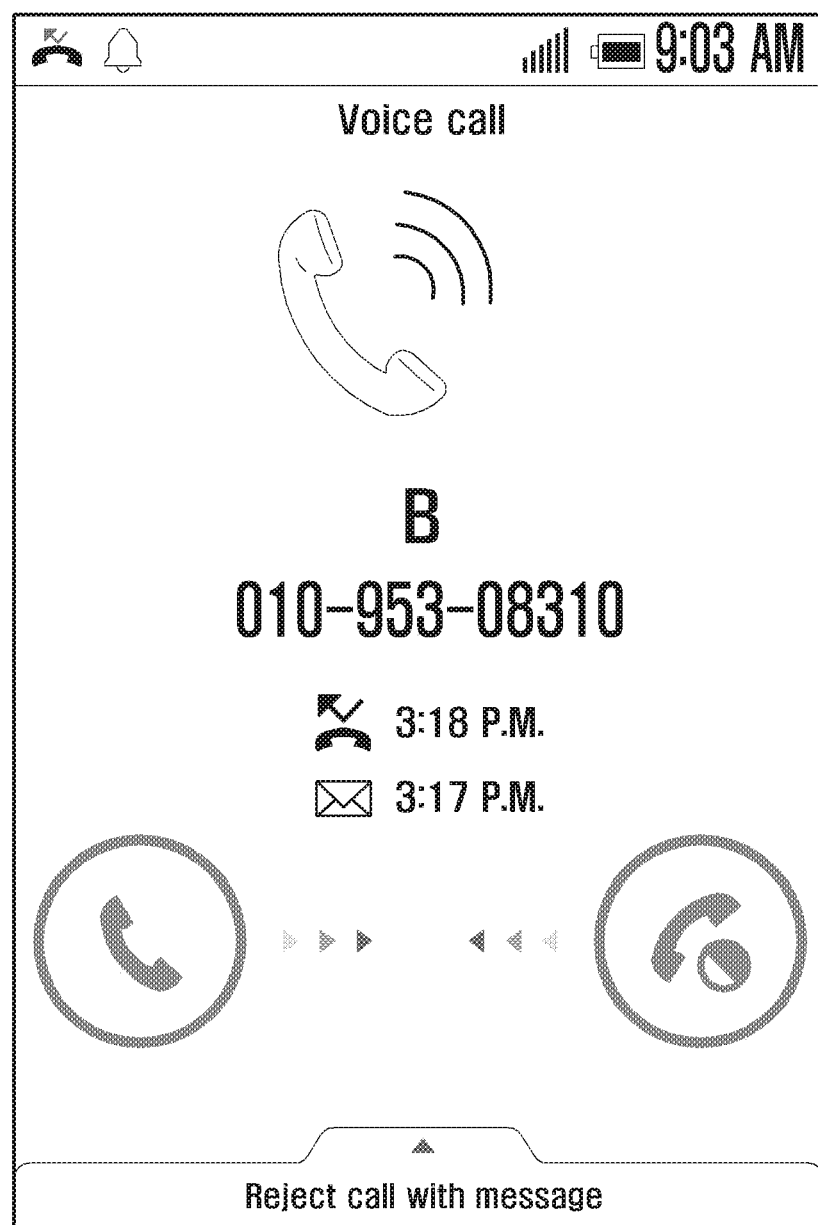
FIGS. 6A to 6C are diagrams illustrating examples of a graphic interface displaying a missed call and an absent message in cooperation with each other according to an exemplary embodiment of the present invention.
Figure 6B:
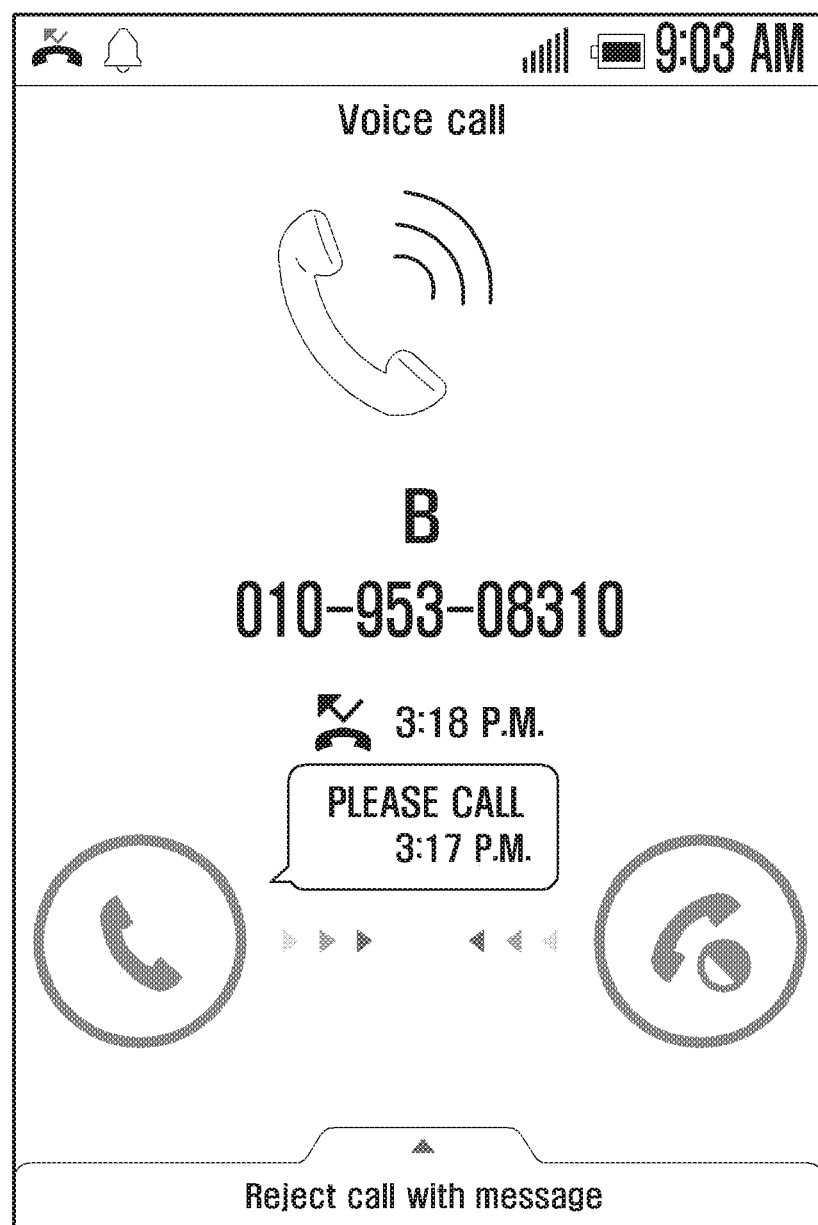
Figure 6C:
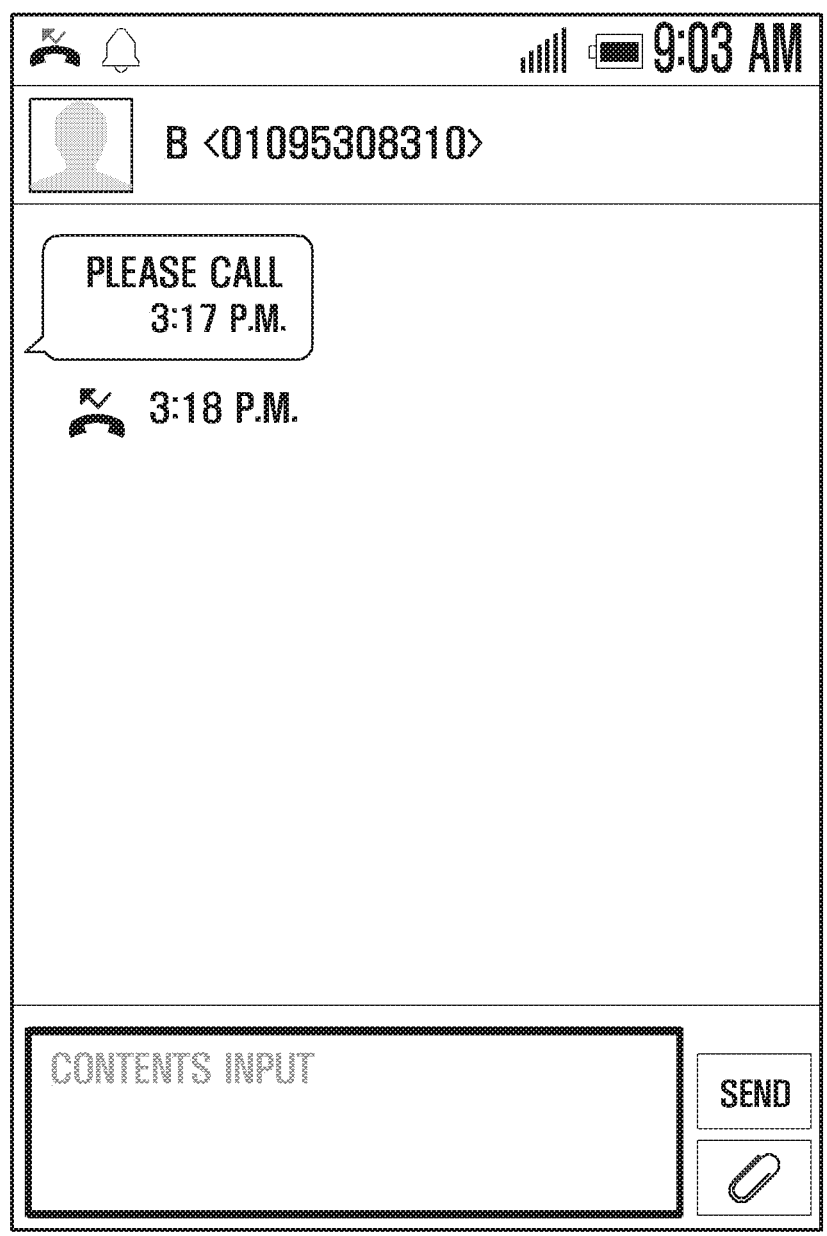

FIGS. 6A to 6C are diagrams illustrating examples of a graphic interface displaying a missed call and an absent message in cooperation with each other according to an exemplary embodiment of the present invention.

When a user does not make contact with user A of the missed call for a predetermined time, user A may send a message requesting a phone call to the user. Further, user A may make a phone call to the user as user A gets no answer after sending the message. In both of the cases, the user receives a missed call and an absent message having the same purpose from the same person. Accordingly, exemplary embodiments of the present invention display the missed call and the absent message in connection with each other.

FIGS. 6A and 6B illustrate an example of an outgoing call screen or an incoming call screen for user A when the missed call is generated by user A. According to exemplary embodiments of the present invention, a message for the missed call and a notification of absent message for user A may be simultaneously displayed as shown in FIG. 6A, and contents of the absent message may be displayed as shown in FIG. 6B.

As another exemplary embodiment, at first, only the notification of the absent message may be displayed as shown in FIG. 6A, and, only when the user selects the notification of the absent message, the content of the absent message may be displayed as shown in FIG. 6B. In this case, when the absent message is displayed, the notification of absent message is removed. Otherwise, the notification of the absent message may be maintained.

Meanwhile, when the user first checks the absent message in a state that the missed call is not checked, as shown in FIG. 6C, the message for the missed call for the number may be displayed on a message check screen. Next, display of the missed call for the number may be removed on a screen such as a lock screen, an idle screen, and a message bar, and may be maintained only on a call list screen.

That is, according to exemplary embodiments of the present invention, when a missed call history or an absent message is checked in connection with the missed call and the absent message, it may be displayed that the missed call and the absent message are checked in a call log. In more detail, when the missed call or the absent message is generated and the user enters a call log to select a missed call list, the controller 160 may display the content of an absent message generated by the same sender or the generation of the absent message.

Further, if message display is selected when the notification of an absent message is displayed, detailed contents of the message can be displayed after the screen moves to a connected absent message. Further, when an absent message item is selected, detailed call history of the missed call may be displayed.

Figure 7:
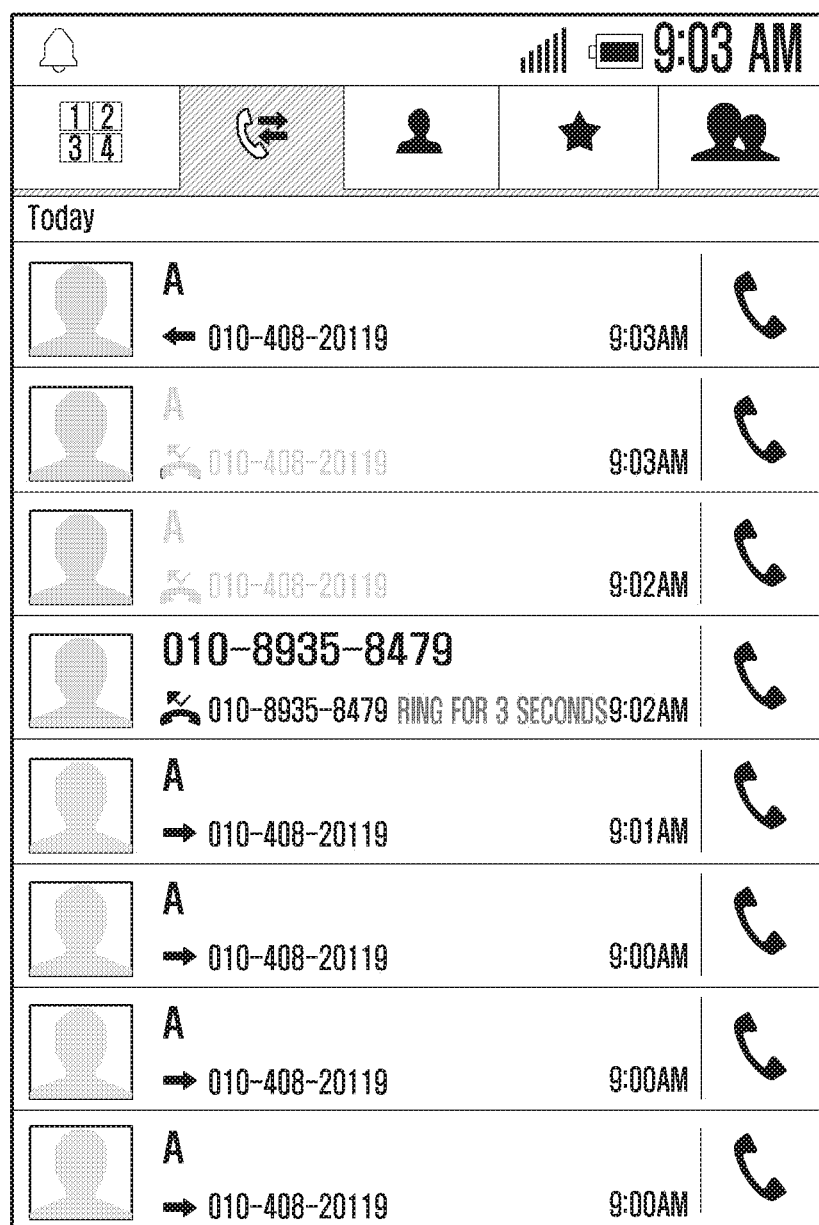
FIG. 7 is a diagram illustrating a graphic interface displaying a generation time of an incoming call sound in a call list according to an exemplary embodiment of the present invention.

FIG. 7 is a diagram illustrating a graphic interface displaying a generation time of an incoming call sound in a call list according to an exemplary embodiment of the present invention.

Referring to FIG. 7, in a case of a missed call having a ringing time of an incoming call sound less than a given time, for example, when the incoming call sound is rung once or for a moment, a ringing time of the incoming call may be displayed together with a message for the missed call. Further, a separate icon may be displayed instead of the generation time of the incoming call sound. This is to provide a possibility of a wrong number or a spam call to the user.

However, the present invention is not limited in displaying a generation time of incoming call sound only when the missed call has a short ringing time. That is, the ringing time of the incoming call sound for all missed calls may be displayed, and, in a case of a missed call having a long ringing time, an icon different from that of the missed call having a short ringing time is also displayed. For example, the missed call that generates an incoming call sound for a long time as a sender continuously attempts the call may be important. In this case, a possibility of requiring a rapid answer may be transferred to the user.

According to exemplary embodiments of the present invention, since a message for a missed call is managed by senders, the user can more efficiently manage an event received in the user's absence. According to exemplary embodiments of the present invention, an absent message is removed when call connection is achieved after the missed call is generated, thereby, convenience of a user is increased and the user can intuitively recognize the transaction of the missed call.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing calls on a mobile terminal, the method comprising:
   displaying a lock screen;
   automatically displaying on the lock screen a first notification indicating a quantity of one or more missed calls from a first terminal, the first notification corresponding to a total quantity of missed calls from the first terminal, after one or more missed calls from the first terminal has occurred;
   automatically displaying on the lock screen a second notification indicating a quantity of one or more missed calls from a second terminal, the second notification corresponding to a total quantity of missed calls from the second terminal, after one or more missed calls from the second terminal has occurred;
   while the first notification and the second notification are included in the lock screen, if an incoming call is received from one of the first terminal and the second terminal, displaying an incoming call screen indicating the incoming call from the one of the first terminal and the second terminal;
   receiving, via the incoming call screen, a user input to accept the incoming call from the one of the first terminal and the second terminal;
   in response to receiving the user input, establishing a call with the one of the first terminal and the second terminal;
   if the call is established with the first terminal, after disconnecting the call with the first terminal, displaying the lock screen including the second notification without the first notification; and
   if the call is established with the second terminal, after disconnecting the call with the second terminal, displaying the lock screen including the first notification without the second notification.

2. The method of claim 1, further comprising:
   displaying a first telephone communication icon corresponding to the first notification; and
   displaying a second telephone communication icon corresponding to the second notification,
   wherein the first telephone communication icon and the second telephone communication icon each comprise an image of a telephone.

3. The method of claim 1, further comprising:
displaying a first identifier corresponding to the first notification, the first identifier identifying the first terminal; and
displaying a second identifier corresponding to the second notification, the second identifier identifying the second terminal.

4. The method of claim 3,
wherein the first identifier comprises at least one of a name or number stored in a phonebook that identifies the first terminal, and
wherein the second identifier comprises at least one of a name or number stored in the phonebook that identifies the second terminal.

5. The method of claim 1, further comprising:
while the first notification and the second notification are included in the lock screen, in response to receiving a user input to a respective one of the first notification and the second notification, establishing the call with the first terminal or the second terminal, and displaying an outgoing call screen indicating an outgoing call with the first terminal or the second terminal.

6. The method of claim 1, wherein the quantity of the one or more missed calls from the first terminal indicated by the first notification is increased, after an additional one or more missed calls from the first terminal has occurred.

7. The method of claim 1, wherein the quantity of the one or more missed calls from the second terminal indicated by the second notification is increased, after an additional one or more missed calls from the second terminal has occurred.

8. A mobile terminal for managing calls, the mobile terminal comprising:
a display; and
a processor electrically coupled with the display and configured to:
control the display to display a lock screen,
control the display to automatically display on the lock screen a first notification indicating a quantity of one or more missed calls from a first terminal, the first notification corresponding to a total quantity of missed calls from the first terminal, after one or more missed calls from the first terminal has occurred,
control the display to automatically display on the lock screen a second notification indicating a quantity of one or more missed calls from a second terminal, the second notification corresponding to a total quantity of missed calls from the second terminal, after one or more missed calls from the second terminal has occurred,
while the first notification and the second notification are included in the lock screen, if an incoming call is received from one of the first terminal and the second terminal, control the display to display an incoming call screen indicating the incoming call from the one of the first terminal and the second terminal,
receive, via the incoming call screen, a user input to accept the incoming call from the one of the first terminal and the second terminal,
in response to receiving the user input, establish a call with the one of the first terminal and the second terminal,
if the call is established with the first terminal, after disconnecting the call with the first terminal, control the display to display the lock screen including the second notification without the first notification, and
if the call is established with the second terminal, after disconnecting the call with the second terminal, control the display to display the lock screen including the first notification without the second notification.

9. The mobile terminal of claim 8,
wherein the processor is further configured to:
control the display to display a first telephone communication icon corresponding to the first notification, and
control the display to display a second telephone communication icon corresponding to the second notification, and
wherein the first telephone communication icon and the second telephone communication icon each comprise an image of a telephone.

10. The mobile terminal of claim 8, wherein the processor is further configured to:
control the display to display a first identifier corresponding to the first notification, the first identifier identifying the first terminal, and
control the display to display a second identifier corresponding to the second notification, the second identifier identifying the second terminal.

11. The mobile terminal of claim 10,
wherein the first identifier comprises at least one of a name or number stored in a phonebook that identifies the first terminal, and
wherein the second identifier comprises at least one of a name or number stored in the phonebook that identifies the second terminal.

12. The mobile terminal of claim 8, wherein the processor is further configured to:
while the first notification and the second notification are included in the lock screen, in response to receiving a user input to a respective one of the first notification and the second notification, establish the call with the first terminal or the second terminal, and control the display to display an outgoing call screen indicating an outgoing call with the first terminal or the second terminal.

13. The mobile terminal of claim 8, wherein the quantity of the one or more missed calls from the first terminal indicated by the first notification is increased, after an additional one or more missed calls from the first terminal has occurred.

14. The mobile terminal of claim 8, wherein the quantity of the one or more missed calls from the second terminal indicated by the second notification is increased, after an additional one or more missed calls from the second terminal has occurred.

* * * * *